United States Patent [19]

Jones

[11] 4,348,439
[45] Sep. 7, 1982

[54] PACKAGE OF WOUND STRAND MATERIAL

[75] Inventor: Otto G. Jones, Burkburnett, Tex.

[73] Assignee: Certain-teed Corporation, Valley Forge, Pa.

[21] Appl. No.: 235,518

[22] Filed: Feb. 18, 1981

[51] Int. Cl.³ .......................... B32B 1/08; B65H 55/02
[52] U.S. Cl. ...................................... 428/36; 206/388; 206/389; 206/409; 428/222; 428/906
[58] Field of Search ................. 428/36, 35, 188, 906, 428/222; 206/388, 389, 484, 409

[56] References Cited

U.S. PATENT DOCUMENTS 3,915,301 10/1975 Gray et al. ........................ 206/497
4,018,337 4/1977 Barnett ............................ 206/484

Primary Examiner—Paul J. Thibodeau
Attorney, Agent, or Firm—Paul & Paul

[57] ABSTRACT

A package is provided of wound strand of filaments coiled in layers, into a tubular configuration, with a sheet material covering of ionic polymer that has a surface attraction to the strand, for keeping the strand against the sheet material or film during unwinding of the strand from the package, completely through to the end of strand removal from the package. Electrostatic charge is induced on the strand and sheet material, to create electrostatic attraction at their common interface, for holding the strand to the sheet material and preventing the last portion of a strand package that is being unwound, from becoming tangled. Accordingly, this electrostatic attraction causes the film to support the outer strand coils in the package as the strand is withdrawn from the package, thereby preventing coils from slumping or falling together and becoming tangled.

39 Claims, 9 Drawing Figures

PACKAGE OF WOUND STRAND MATERIAL

BACKGROUND OF THE INVENTION

In the art related to the packaging of strand material, various techniques have been employed to prevent entanglement of the strand as it nears complete unwinding of the package. Such techniques are taught in U.S. Pat. Nos. 3,983,997, 3,915,301, 3,731,792, 4,220,295 and 3,850,294. Among the techniques taught in the prior art are the application of adhesive materials to the interior of the plastic film or sheet cover around the strand package, such that the adhesive secures the outer strand layer to the package, and prevents it from falling inwardly thus becoming entangled. Another technique resides in allowing the outer sheet film to controllably collapse. Other techniques reside in causing a high degree of film shrinking about the package, that causes an intimate physical relationship between the outer strand and the sheet material, which provides support for outer coils in the package.

SUMMARY OF THE INVENTION

The present invention resides in creating an attraction between the outer layer of wound strand material in a package and the sheet film layer disposed thereabout, by using a sheet film layer that is an ionic copolymer, which sheet material prevents collapse of the outer wound strand material being removed from the package, and which consequently prevents entanglement of the strand material. An induced electrostatic attraction between the outer strand material and the adjacent sheet material causes an attraction of the strand and sheet material which prevents the strand from collapsing upon unwinding the package.

Accordingly, it is an object of this invention to provide a novel package of fibers (or filaments) of strand material that are coiled into a generally tubular configuration, with a sheet material constructed of ionic copolymer, forming an attraction with the outer strand material which prevents collapse of strand coils upon unwinding.

It is a further object of this invention, to provide a package of wound strand material and sheet covering, wherein an electrostatic attraction between the outer strand material and the sheet covering for the package prevents collapse of the package upon uncoiling the strand material from the sheet covering.

It is a further object of the present invention to accomplish the above objects, wherein the strand material is of glass construction, and most preferably where it is of "E" glass or generally alkaline-free glass construction.

Other objects and advantages of the present invention will be readily apparent to those skilled in the art from a reading of the following brief descriptions of the drawing figures, detailed descriptions of the preferred embodiments, and the appended claims.

BRIEF DESCRIPTIONS OF THE DRAWING FIGURES

In the drawings

Figure 8:
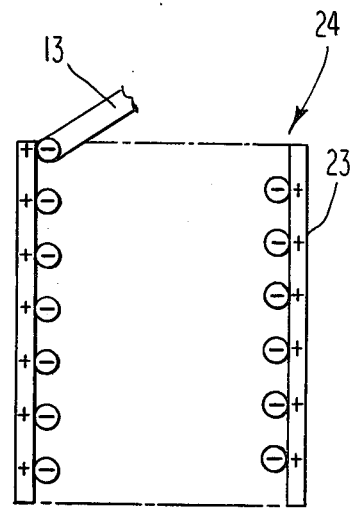

FIG. 8 is an enlarged schematic transverse, cross-sectional view, taken generally longitudinally through one type of package in accordance with this invention, at a stage of unwind of the package at which there is illustrated only one layer of strand coils adjacent the exterior covering, and wherein the electrostatic attraction between the strand coils and the sheet covering is schematically illustrated.

DETAILED DESCRIPTION OF THE PREFERRED EMBODIMENTS

Figure 1:
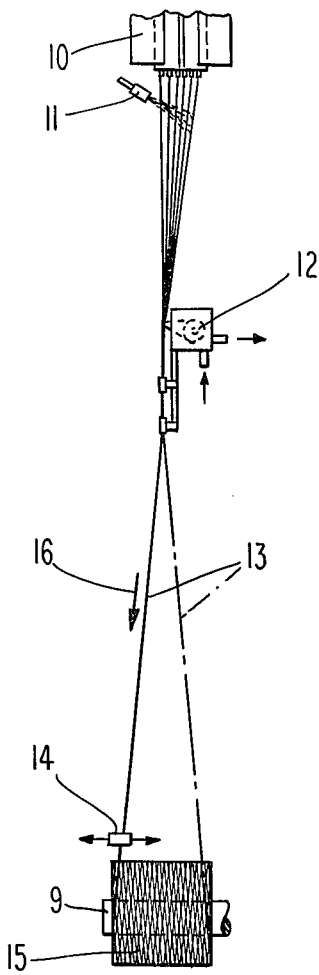
FIG. 1 is a schematic view of strand material of the glass roving type being wound directly from the bushing through which it is formed, into a package of tubular configuration.

Referring now to the drawings in detail, reference is first made to FIG. 1, wherein a bushing 10 is illustrated, through which molten glass is delivered in filaments, past treatment station 11, with the filaments being brought together to form a strand at 12, and delivered in the direction of the arrow 16, through a guide eye in a traversing guide member 14 that moves back-and-forth in the direction of the arrows indicated in a conventional manner. The strand is thus wound onto a mandrel 9, to form a tubular cylindrical winding 15.

Figure 1A:
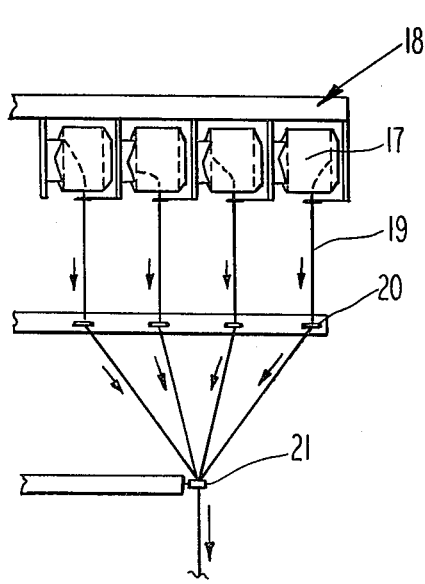
FIG. 1A is a schematic view of indirect strand package formation, with the strand for forming the package being comprised of feeder strand from feeder packages carried on a creel.

In FIG. 1A, the strand 13 is formed indirectly from a plurality of feeder packages 17 carried by a creel 18, with filaments 19 being pulled through guide eyes 20 and 21 to then pass, as with the embodiment of FIG. 1, but not illustrated, onto a mandrel after passing through a traversing guide member.

It will be apparent that any of various techniques may be utilized to bring strand to the stage of a generally tubular cylindrical winding 15, other than the techniques of FIGS. 1 and 1A.

The strand material 13 is thus wound into a generally tubular package of coiled fibers, with many individual fibers (or filaments) making up the strand, and with the various coils being superimposed over other coils. It will be understood that the strand 13 is generally very tightly wound preferably onto a paper sleeve, that in turn is carried by a mandrel with the mandrel being preferably collapsible to facilitate removal of the package of strand 13 therefrom. It should also be understood that the purpose of winding the strand 13 is to form a generally self-supporting package.

The strand 13 may be comprised of any of various kinds of materials, but most preferably will be comprised of a multiple filament glass material, such as an alkaline-free glass known in the trade as "E" glass. Suitable strand materials 13 that have been found to be desirable for the practice of the present invention, have included 100 percent "E" glass (e.g., made in accordance with U.S. Pat. No. 2,334,961), 100 percent "R" (or high-strength) glass (e.g., made in accordance with French Pat. No. 1,435,073), 100 percent polyester, 100 percent nylon, 100 percent cotton, and mixtures of nylon and other materials. Accordingly, the strand, yarn, or roving may be comprised of various materials. Also, it has been found that, in accordance with the present invention, various sizes or sizings, such as are conventionally applied to glass roving filaments upon their formation, may be utilized, without departing from the attraction between the strand and sheet layer. Likewise, other sizings that are applied to other strand materials have been found not to interfere with the attraction between the strand material and sheet film applied thereabout. Furthermore, the degree of catenary, or fuzziness of the strand material is not a significant factor affecting the attraction between the strand and the sheet applied thereabout.

Figure 2:
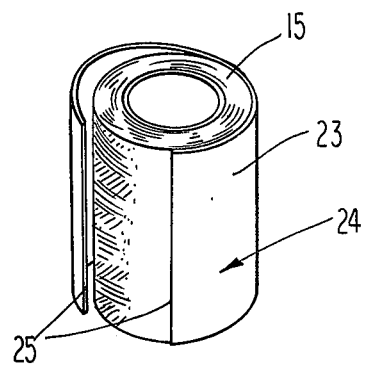
FIG. 2 is a perspective view of the wound tubular strand configuration, together with a sheet material covering being illustrated in application thereto.

With reference to FIG. 2, the tubular winding 15 is shown in removed condition relative to the mandrel 14, with the sheet or film 23 being applied thereabout. The sheet 23 is a rectangular sheet, whose width (or height as viewed in FIG. 2) is substantially that of the height of the tube 15 (although it may, if higher than the tube, be folded underneath the tube 15, in a manner not shown), and whose length is sufficient to at least accommodate a complete wrapping around the exterior of the tube 15.

The sheet material 23 is an ionic hydrocarbon copolymer of the type that is sold under the trademark SURLYN, of E. I. duPont de Nemours and Company, in accordance with U.S. Pat. No. 3,264,272, dated Aug. 2, 1966, the complete disclosure of which is herein incorporated by reference.

Figure 3:
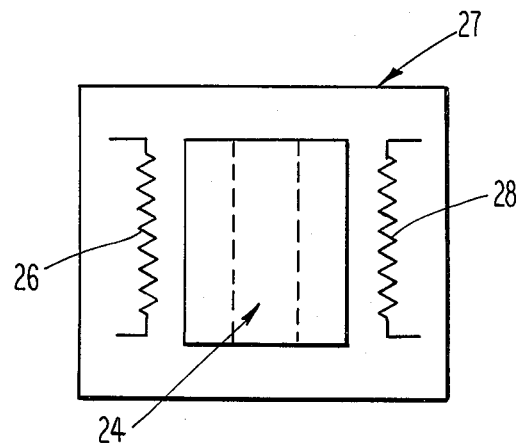
FIG. 3 is a schematic view of the package formed in accordance with FIG. 2, being subjected to a somewhat elevated temperature in an oven.

In FIG. 3, the package 24, formed from the tube 15 and the applied sheet 23 (which may optionally have a sheet end 25 secured by an adhesive strip or in any other manner), is subjected to a generally low temperature heat application, preferably at about 200° Fahrenheit, for about 5 seconds, by means of electric heating elements 25 and 26, in a heat chamber 27, or in any other suitable manner, for the purpose of applying enough heat to the film 23, to very slightly shrink it, substantially only an amount sufficient to remove air bubbles from the interface of the outer strand windings and the sheet material 23.

Thereafter, the package 24 may, if desired, be deposited in a bag or other suitable dust cover, or the like, or otherwise packed for shipment to a user, to be unwound by the user.

Figure 4:
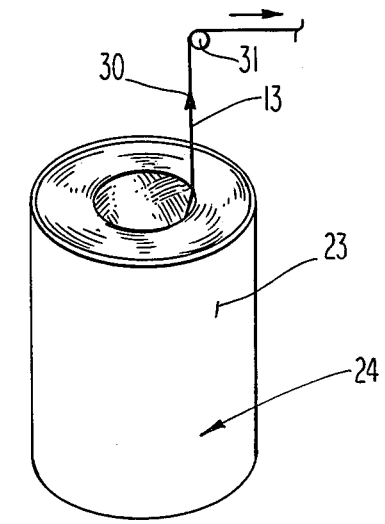
FIG. 4 is a schematic perspective view of the package formed in accordance with FIGS. 1 through 3, with the strand material being unwound or withdrawn from the center thereof.
Figure 5:
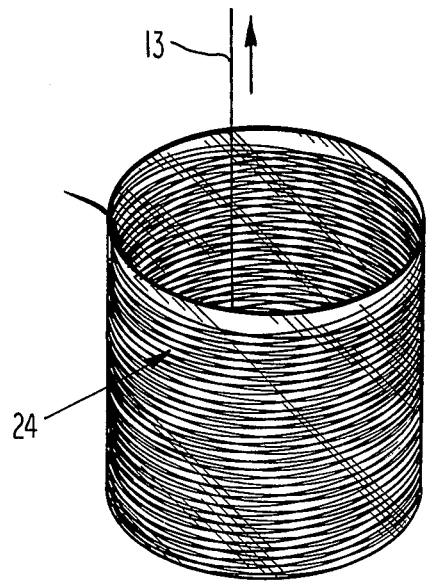
FIGS. 5, 6 and 7 are sequential perspective views of the strand material being unwound from the package, at various stages of unwinding, without collapse of strand coils.
Figure 6:
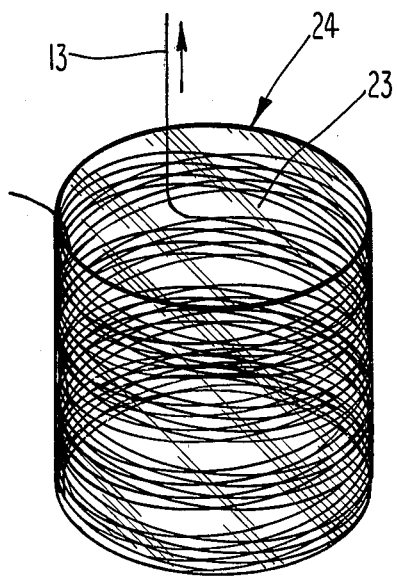
Figure 7:
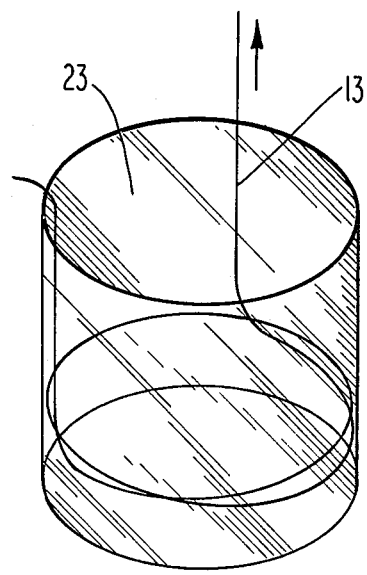

In FIG. 4, a perspective illustration shows the unwinding of the string 13, from the interior of the tube, in the direction of the arrow 30, with the strand unwinding from the inside, up and over idler 31. FIGS. 5, 6 and 7 likewise show the package 24 in various stages of being unwound.

In FIG. 5, a great portion of the strand has been unwound, leaving enough unwound coils to substantially completely cover the inner surface of the sheet 23.

In FIG. 6, the remaining unwound strand, does not cover the sheet 23, but those strands that are not self-supporting relative to each other are shown to remain in attracted adjacent communication with the sheet 23, without collapsing and falling to the bottom of the package.

In FIG. 7, this same phenomena is illustrated, but with the strand 13 remaining in adjacent attracted relation to the sheet 23, substantially to the last coil of the tube 15, without collapse of the strand.

In FIG. 8, the unwinding of the strand 13 is illustrated, as is the electrostatic attraction symbolized by the charges (+,−), between strand coils at the exterior of the tube and the layer of sheet material disposed thereabout.

As the strand 13 is pulled from the package, uncoiling the various strand coils seriatim, it causes sufficient movement or wiping of the strand along the package to induce an electrostatic charge between this particular sheet material 23 and the strand coils that are close to the sheet 13. This charge forms an attraction between the strand and sheet, that will remain undissipated for a period of time even if the unwinding of the package is interrupted. This charge is sufficiently strong to hold strands of the various materials discussed herein against the sheet without collapsing, notwithstanding the relative heaviness of some of the materials, such as glass.

In some tests of wound glass with a sheet made in accordance with U.S. Pat. No. 3,264,272, voltage measurements on the order of 2,000 to 3,000 volts were noted at a location about 2 inches outside the package being unwound, at an early stage of unwinding, such as, at the stage of unwinding illustrated in FIG. 4. During such test, it was noted that, as the glass roving being unwound approached a stage of unwinding such as that indicated in FIG. 5, where there was only approximately $\frac{1}{8}$ inch or less of roving left inside the outer sheet material, there was an abrupt change in the measurable voltage, whereby the voltage increased to 80,000 to 90,000 volts, and simultaneously there occurred a polarity reversal, whereby what had previously been read as a positive voltage outside the sheet material, was then read as a negative voltage outside the sheet material. This test occurred at an unwinding speed of about 250 feet per minute. The abrupt change noted above occurred just as the film became visible through the as-yet-unwound glass roving. It has otherwise been noted that higher potentials are reached when the outside wrapped film has a higher sodium content.

It will be apparent from the foregoing that the ends of the invention are accomplished by means of a package formed as described hereinabove, in that there is no strand collapse of the outer layer of the package, prior to complete unwinding, and that such is accomplished without the use of an applied tackiness or adhesive to the interior surface of the film.

What is claimed:

1. A package comprising a strand of filaments or fibers coiled in layers into a generally tubular configuration having a generally cylindrical outer surface and a sheet material extending around said cylindrical outer surface, said sheet material being an ionic copolymer of α-olefins having the formula R-CH=CH$_2$, where R is a radical selected from the class consisting of hydrogen and alkyl radicals having from 1 to 8 carbon atoms, and α,β-ethylenically unsaturated carboxylic acids having from 3 to 8 carbon atoms, said copolymers having from 10% to 90% of the carboxylic acid groups ionized by neutralization with metal ions uniformly distributed throughout the copolymer, said copolymer being a direct copolymer of the α-olefins and the unsaturated carboxylic acid in which the carboxylic acid groups are randomly distributed over all molecules and in which (1) the α-olefin content of the copolymer is at least 50 mol percent, based on the α-olefin-acid copolymer, (2) the unsaturated carboxylic acid content of the copolymer is from 0.2 to 25 mol percent, based on the α-olefin-acid copolymer, and (3) any other monomer component optionally copolymerized in said copolymer is mono-ethylenically unsaturated, and said metal ions having an ionized valence of from one to three inclusive when the unsaturated acid is a mono-carboxylic acid and an ionized valence of one when the unsaturated acid is a dicarboxylic acid and said metal ions being selected from the group consisting of uncomplexed and complexed metal ions, said ionic copolymers having solid state properties characteristic of crosslinked polymers and melt-fabricability properties characteristic of uncrosslinked, thermoplastic polymers, wherein the cylindrical outer strand portions at the interface with said sheet material and said sheet material comprise means for holding an induced electrostatic charge and remaining in electrostatic co-attracting relation to each other an amount sufficient to hold otherwise unsupported strand coils against the sheet material without coil collapse upon unwinding of the strand.

2. A package comprising a strand of filaments of fibers coiled in layers into a generally tubular configuration having a generally cylindrical outer surface and a sheet material extending around said cylindrical outer surface, said sheet material being an ionic copolymer of ethylene and an $\alpha,\beta$-unsaturated monocarboxylic acid having from 3 to 8 carbon atoms, said copolymers having from 50% to 80% of the carboxylic acid groups ionized by neutralization with metal ions having an ionized valence of from one to three inclusive uniformly distributed throughout the copolymer, said metal ions being selected from the group consisting of uncomplexed and complexed metal ions, said copolymer being a direct copolymer of ethylene and the unsaturated monocarboxylic acid in which the carboxylic acid groups are randomly distributed over all molecules and in which the ethylene content of the copolymer is from 90 to 99 mol percent, based on the ethylene-acid copolymer, and the unsaturated monocarboxylic acid content of the copolymer is a complementary amount from 10 to 1 mol percent, based on the ethylene-acid copolymer, said ionic copolymers having solid state properties characteristic of crosslinked polymers and melt-fabricability properties characteristic of uncrosslinked, thermoplastic polymers, wherein the cylindrical outer strand portions at the interface with said sheet material and said sheet material comprise means for holding an induced electrostatic charge and remaining in electrostatic co-attracting relation to each other an amount sufficient to hold otherwise unsupported strand coils against the sheet material without coil collapse upon unwinding of the strand.

3. The package of claim 1 in which the $\alpha,\beta$-ethylenically unsaturated carboxylic acid is monocarboxylic.

4. The package of claim 1 in which the $\alpha$-olefin of formula R-CH=CH$_2$ is ethylene and the $\alpha,\beta$-ethylenically unsaturated carboxylic acid is monocarboxylic.

5. The package of claim 1 in which the $\alpha$-olefin of formula R-CH=CH$_2$ is ethylene and the $\alpha,\beta$-ethylenically unsaturated carboxylic acid is a dicarboxylic acid having from 4-8 carbon atoms.

6. The package of claim 5 in which the metal ions are complexed metal ions selected from the group consisting of complexed metal ions of metals in Groups II, III, IV-A and VIII of the Periodic Table of Elements.

7. The package of claim 3 in which the metal ion is an ion of a metal in Group I of the Periodic Table of Elements.

8. The package of claim 7 in which the metal ion is an ion of an alkali metal.

9. The package of claim 3 in which the metal ion is an ion of a metal in Group II of the Periodic Table of Elements.

10. The package of claim 9 in which the metal ions are magnesium ions.

11. The package of claim 3 in which from 50 to 80 percent of the said $\alpha,\beta$-unsaturated carboxylic acid is neutralized by the said metal ions.

12. The package of claim 4 in which the $\alpha,\beta$-unsaturated monocarboxylic acid is acrylic acid.

13. The package of claim 4 in which the $\alpha,\beta$-unsaturated monocarboxylic acid is methacrylic acid.

14. The package of claim 2 in which the metal ions are alkali metal ions.

15. The package of claim 14 in which the metal ions are sodium ions.

16. The package of claim 2 in which the metal ions are ions of a metal of Group II of the Periodic Table of Elements.

17. The package of claim 16 in which the metal ions are zinc ions.

18. The package of claim 4 in which the copolymer is an interpolymer of ethylene, methacrylic acid and a third copolymerizable monomer.

19. The package of claim 18 in which the third copolymerizable monomer is vinyl acetate.

20. The package of claim 18 in which the third copolymerizable monomer is methyl methacrylate.

21. The package of claim 3 in which the $\alpha$-olefin is a mixture of ethylene and propylene.

22. The package of claim 3 in which the metal ions are complexed metal ions selected from the group consisting of complexed metal ions of metals in Groups II, III, IV-A and VIII of the Periodic Table of Elements.

23. The package of claim 5 in which the metal ions are alkali metal ions.

24. The package of claim 5 in which the $\alpha,\beta$-unsaturated dicarboxylic acid is maleic acid.

25. The package of claim 4 in which the $\alpha,\beta$-unsaturated monocarboxylic acid is methyl hydrogen maleate.

26. The package of claim 5 in which the $\alpha,\beta$-unsaturated dicarboxylic acid is fumaric acid.

27. The package of claim 5 in which the $\alpha,\beta$-unsaturated dicarboxylic acid is itaconic acid.

28. The package of claim 5 in which from 50 to 80 percent of said carboxylic acid groups are ionized by neutralization with metal ions.

29. The package of claim 28 in which the metal ions are sodium ions.

30. The package of claim 1, wherein the strand of fiber is of glass filaments.

31. The package of any of claims 1 to 29 wherein the strand of fibers is of glass filaments.

32. The package of any of claims 1 to 29 wherein the strand of fibers is of alkaline-free glass filaments.

33. The package of any of claims 1 to 29 wherein the strand of fibers is of polyester filaments.

34. The package of any of claims 1 to 29 wherein the strand of fibers is at least partially of cotton filaments.

35. The package of any of claims 1 to 29 wherein the strand of fibers is at least partially of nylon filaments.

36. The package of any of claims 1 to 30 wherein the sheet material is in heat shrunk relation to the cylindrical outer strand surface, substantially only an amount sufficient to remove air bubbles from the interface of said cylindrical outer strand surface and the sheet material.

37. A package comprising a strand of filaments or fibers coiled in layers into a generally tubular configuration having a generally cylindrical outer surface and a sheet material extending around said cylindrical outer surface, wherein the cylindrical outer strand portions at the interface with said sheet material and said sheet material comprise means for holding an induced electrostatic charge and remaining in electrostatic co-attracting relation to each other an amount sufficient to hold otherwise unsupported strand coils against the sheet material without coil collapse upon unwinding of the strand.

38. The package of claim 37, wherein said sheet material is an ionic copolymer, and said strand is of glass construction.

39. The package of claim 37, wherein said strand is of alkaline-free glass construction.

* * * * *